United States Patent [19]

Benton et al.

[11] Patent Number: 4,914,281

[45] Date of Patent: Apr. 3, 1990

[54] IDENTIFICATION APPARATUS FOR OPERATING SECURE EQUIPMENT

[75] Inventors: William M. Benton, Fort Lauderdale; William Mee, Pompano Beach, both of Fla.

[73] Assignee: Moneyfax, Inc., Ft. Lauderdale, Fla.

[21] Appl. No.: 236,612

[22] Filed: Aug. 23, 1988

[51] Int. Cl.[4] .............................................. G06K 19/06

[52] U.S. Cl. .................................... 235/492; 235/375; 235/441

[58] Field of Search ........................ 235/375, 492, 441

[56] References Cited

U.S. PATENT DOCUMENTS 4,578,573 3/1986 Flies .................................. 235/492

*Primary Examiner*—Harold I. Pitts

*Attorney, Agent, or Firm*—Lowe, Price, LeBlanc, Becker & Shur

[57] ABSTRACT

An apparatus for turning on and off, selectively, a piece of equipment and processing data pertaining thereto comprises a mechanical key adapted to interfit with a key receptacle provided at equipment to be secured, wherein movement of the key receptacle by the key is operative selectively to enable or disable operation of the machine. An integrated circuit including a solid state memory is provided within the key for processing electrical signals, and electrical contacts positioned on a periphery of the key are in contact with the integrated circuit and with corresponding electrical contacts in the receptacle. When the key is inserted into the receptacle and rotated to turn on the equipment, data transfer is established between the integrated circuit within the key and circuitry within the equipment. An identification card containing information corresponding to information stored in the integrated circuit is coupled to the key by a cord.

10 Claims, 3 Drawing Sheets

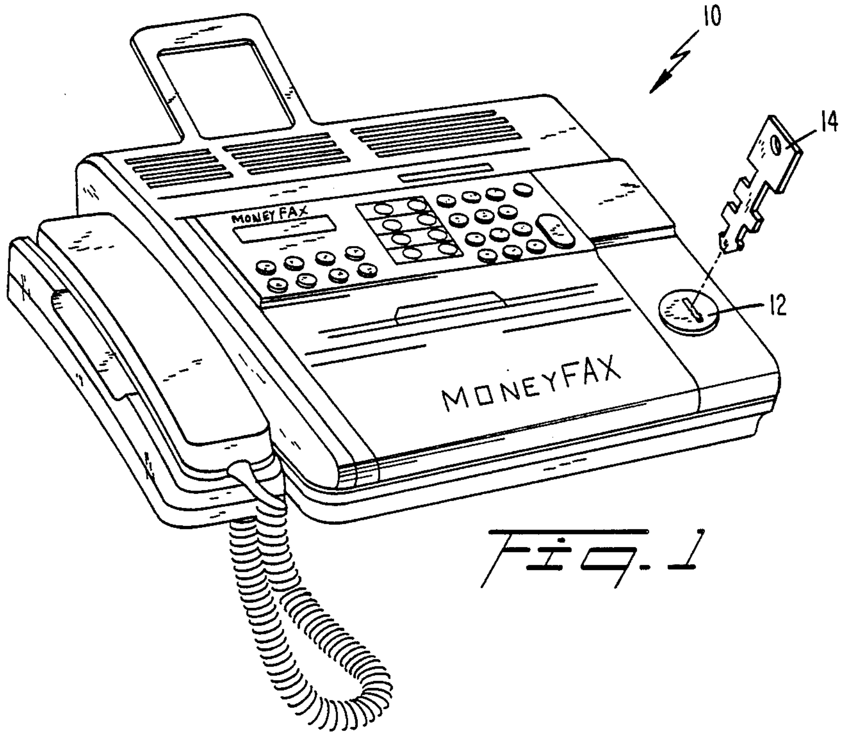
Fig. 1
Fig. 2
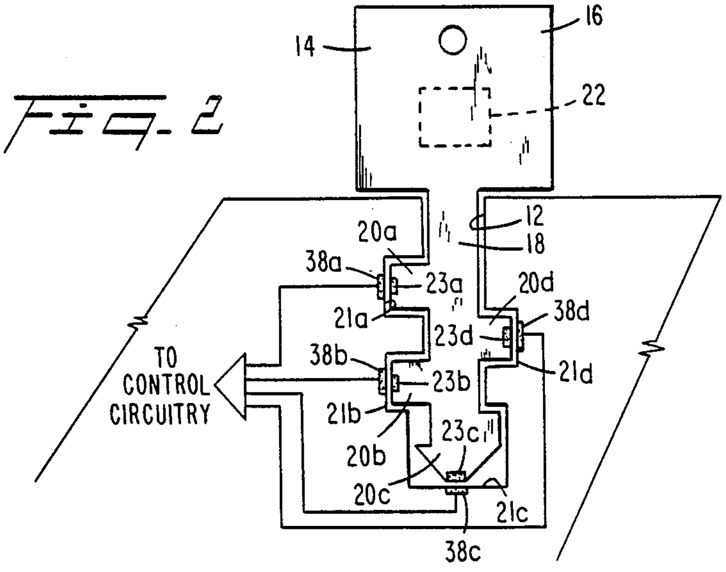

IDENTIFICATION APPARATUS FOR OPERATING SECURE EQUIPMENT

TECHNICAL FIELD

This invention relates generally to security apparatus, and more particularly, to security apparatus incorporating attributes of both mechanical and electronic keys. The invention also relates to combining common data in a mechanical key and standard identification (credit) card.

BACKGROUND ART

Electronic equipment, such as computers, facsimile machines and copiers, often are secured against unauthorized use by requiring a mechanical key for operation thereof. The key interfits with a key receptacle provided in the equipment, and the receptacle in turn controls an electrical switch that enables or disables the equipment depending on the position of the key.

Another level of security applied to such equipment is carried out by an identification card containing identification data encoded on a magnetic or optical stripe thereon, stored in an integrated circuit "chip" in the card, formed on embossments of the card or as a combination thereof. In some equipment, therefore, the manufacturer of the equipment must provide, and the user must carry, both a mechanical key and identification card, to operate the equipment.

The cost of providing an integrated circuit within a conventional credit card for this purpose is expensive, bearing in mind that the thickness of the card is, by standard, 30 mils. However, an integrated circuit for this purpose is necessary to process identification data stored therein together with keyboard entered data to determine whether the user is authorized to operate the equipment as well as to carry out data logging and reporting.

For example, in U.S. patent application Ser. No. 236,614 to the inventors named in this application, filed concurrently herewith, an apparatus for carrying out financial transactions at a common site or at remote sites via a facsimile machine, uses, in one embodiment thereof, a mechanical key containing an integrated circuit "chip" for turning on the facsimile machine and storing transaction data and a facsimile signature of the owner.

DISCLOSURE OF THE INVENTION

Accordingly, one object of the invention is to provide a combination mechanical key and integrated circuit carrier for carrying out facsimile machine control in accordance with the copending application.

Another object of the invention is to provide a security device which combines attributes of both a mechanical key and an identification card.

Another object is to provide to a mechanical key for electronic equipment communication of electronic data between circuitry stored in the key and circuitry within the equipment.

Still another object is to provide an identification and information processing module having a carrier for an integrated circuit that is mechanically durable and easily manufactured.

A further object of the invention is to provide EEPROM memory attributes to a mechanical key for operating secured equipment thereby to eliminate the necessity to encapsulate an integrated circuit within a card.

To satisfy the above and other objects, a data processing apparatus in accordance with the invention comprises a key adapted to interfit with a key receptacle provided at equipment to be secured, and being operative to enable operation of the equipment. An integrated circuit including solid state memory means is within the key for processing electrical signals, and electrical contacts positioned on a periphery of said key are in contact with corresponding electrical contacts in the receptacle and with appropriate ports of the integrated circuit. An information bearing identification card is coupled to the key, and the card has stored thereon data corresponding to data stored in the integrated circuit. The card and key preferably are loosely interconnected by a cord.

The key may be a mechanical key whereby movement thereof in its socket within the equipment effect a function of the equipment.

In accordance with another aspect of the invention, the key is formed with a plurality of protrusions extending therefrom and carrying the peripheral electrical contacts thereon. Preferably, the integrated circuit includes a serial data communication port for providing serial data to a data terminal of the key.

Still other objects and advantages of the present intervention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 1 is a perspective view of a piece of equipment secured by a data processing key of the invention.

FIG. 2 is a perspective view of a portion of a piece of secured equipment detailing a key receptacle and data processing key of the invention seated therein.

BEST MODE FOR CARRYING OUT THE INVENTION

Figure 3:
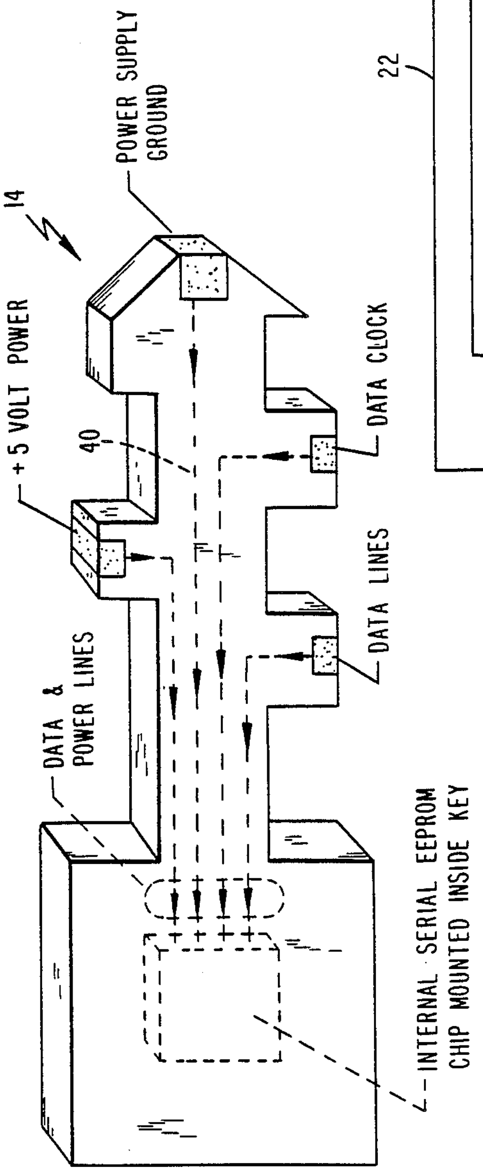
FIG. 3 is a detailed view of the data processing key with integrated circuit, terminal contacts and interconnecting wires visible therein.

Referring to FIG. 1, a facsimile machine 10, exemplary of any of a number of different types of apparatus to be secured, in accordance with the principles of the invention, includes, in addition to manual controls externally available to equipment of this type, a key receptacle 12 adapted to receive a data processing key 14. The key 14 contains electronic circuitry in the form of an integrated circuit "chip" that, when seated within the receptacle 12, establishes bidirectional communications with control circuitry (not shown) within the equipment. The key 14 is structurally rigid, in a typical manner, so that it is able to rotate the key receptacle 12 to turn the equipment on or off in the usual manner. Details of the equipment 10, not described herein, are provided in the copending application, supra, incorporated herein by reference.

In FIG. 2, the key 14 has an enlarged end portion 16 for gripping between the thumb and forefinger, connected to a shank 18 which has a periphery formed with protrusions having sizes and locations on the shank peculiar to the particular key. For example, in the embodiment of FIG. 2, the key shank 18 has four protrusions 20a–20d at the locations shown. The receptacle 12 similarly is formed with seats 21a–21d at positions corresponding to the protrusions 20a–20d of the key shank 18.

Figure 4:
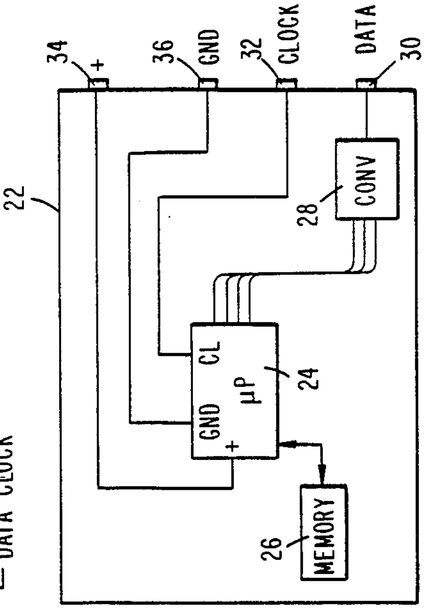
FIG. 4 is a circuit block diagram of the integrated circuit of FIG. 3.

Electrical contacts 23a–23d formed at the ends of protrusions 20a–20d, are interconnected with an integrated circuit 22 formed in the enlarged portion 16 of, or elsewhere on, the key 14 as shown in more detail in FIG. 3. The integrated circuit 22 (See FIG. 4) contains a microprocessor 24, a memory 26, preferably in the form of an electrically erasable programmable read only memory (EEPROM) and a parallel-to-serial bit converter 28 to establish a serial data port. The integrated circuit 22 has a serial data port 30, clock terminal 32 and power supply terminals 34 and 36, interconnected with the microprocessor 24, memory 26 and converter 28 as shown. Power supply and clock interconnections with memory 26 and converter 28 are omitted, for brevity.

Referring again to FIG. 2, provided within key receptacle 12, and located within seats 21a–21d, are electrical contacts 38a–38d which become interconnected with contacts 23a–23d when the key 14 is located within the receptacle. Wires 40, as shown in FIG. 3, interconnect the key contacts 23a–23d with corresponding receptacle contacts 38a–38d as shown.

Accordingly, when the key 14 is inserted within receptacle 12 of a piece of secured equipment, the equipment is turned on by rotating the key and receptacle in a typical manner. However, once the equipment is turned on by rotation of the key and receptacle, bidirectional data transfer takes place between the integrated circuit 22 inside key 14 and control circuitry within the equipment. This data communication may, for example, establish that the holder of the key is authorized to use the equipment, by comparing a personal identification number, keyboard entered by the keyholder, with a corresponding number stored in memory 26 of integrated circuit 22. Furthermore, data logging by storing information transmitted by the equipment to key 14 may be carried out by memory 26. As in the copending application, there additionally may be a facsimile signature stored in the memory 26, to be read therefrom and, ultimately, printed together with transaction summary data.

Figure 5:
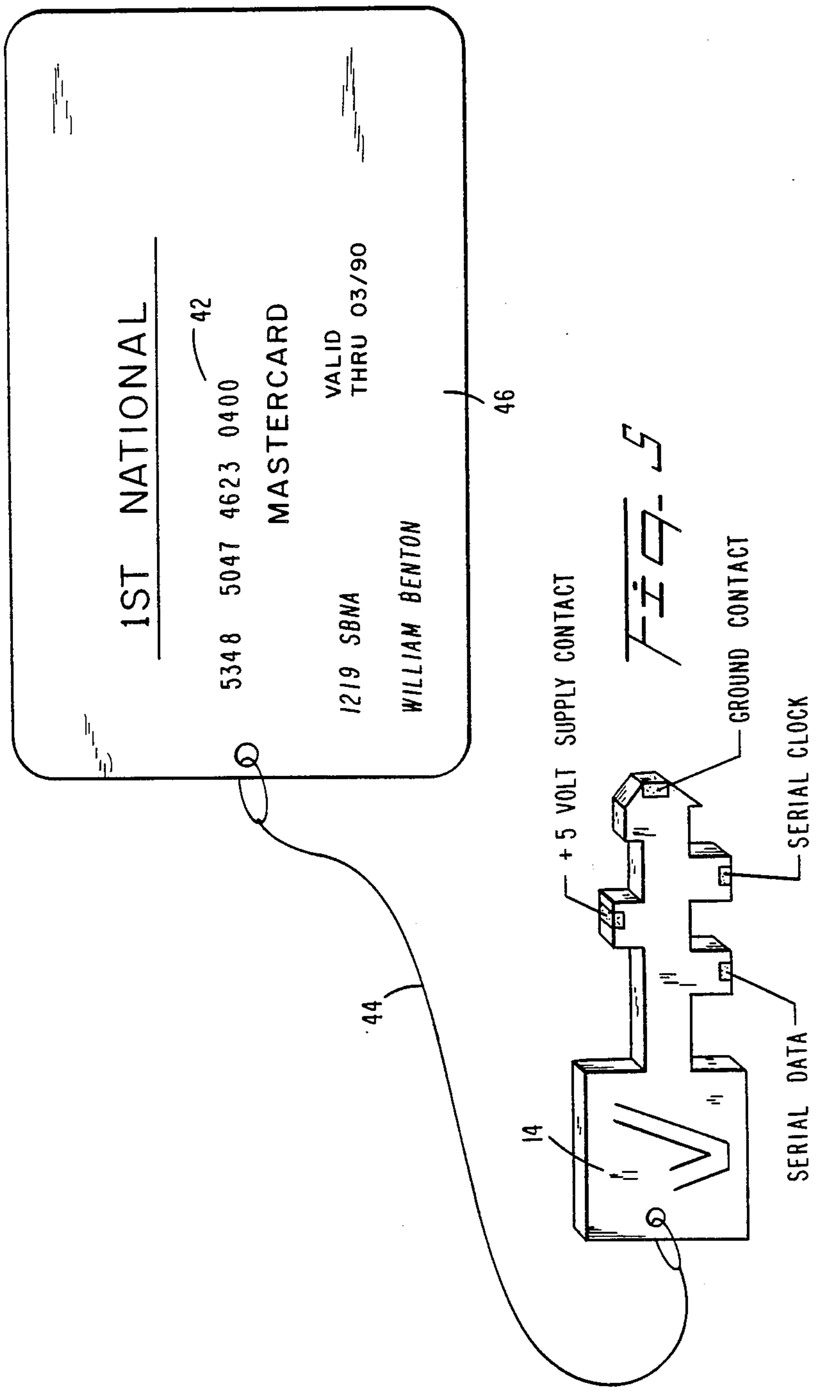
FIG. 5 shows a data processing key and corresponding identification card interconnected by a cord in accordance with another aspect of the invention.

Referring now to FIG. 5, in accordance with another aspect of the invention, key 14 is coupled to a standard identification card 40 which may contain embossed lettering 42 as well as a magnetic stripe (not shown) storing the same and additional data. The data provided on card 40 corresponds with at least some of the data stored in memory 26 of integrated circuit 22 within the key 14. A cord 44, formed of nylon or other suitable material, interconnects the key and card 40, to retain the two together, permanently.

Accordingly, a user may use either his credit card 40 or data processing key 14, depending upon whether data processing, which would require use of the key, is required in a particular transaction. Thus, the manufacturer does not have to encapsulate an integrated circuit within the card 40, thereby avoiding substantial expense. Furthermore, the user is able to carry out transactions using conventional embossing machines and magnetic stripe readers, which are widely proliferated throughout the world, as well as the data processing key 14 for dedicated secure equipment, with both the key and card sharing common data.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Data processing apparatus for enabling/disabling secured equipment, comprising:

- a key adapted to interfit with a key receptacle provided at equipment to be secured;
- an integrated circuit including solid state memory means within said key for processing electrical signals;
- electrical contacts positioned on a periphery of said key to be in contact with corresponding electrical contacts in said receptacle;
- means for interconnecting said electrical contacts on said periphery with said integrated circuit; and
- an information bearing identification card coupled to the key, the card having stored thereon data corresponding to data stored in the integrated circuit.

2. The apparatus of claim 1, wherein said interconnecting means includes electrical conductors connected between said periphery contacts and data, clock and power terminals of said integrated circuit means.

3. The apparatus of claim 1, wherein said integrated circuit means includes an EEPROM.

4. The apparatus of claim 1, wherein said key is formed with a plurality of protrusions extending therefrom and carrying said peripheral electrical contacts thereon.

5. The apparatus of claim 1, including a cord for coupling together said card and said key.

6. The apparatus of claim 2, wherein said integrated circuit means includes a serial data communication port for providing serial data to said data terminal of said key.

7. Data processing apparatus for enabling/disabling secured equipment, comprising:

- a key receptacle provided in said equipment to be secured, said key receptacle having electrical contact terminals thereon interconnected with control circuitry of said equipment;
- a key adapted to interfit with said key receptacle;
- an integrated circuit including solid state memory means within said key for processing electrical signals;
- electrical contacts positioned on a periphery of said key to be in contact with corresponding electrical contacts in said receptacle;
- means for interconnecting said electrical contacts on said periphery of said key with said integrated circuit; and
- an information bearing identification card coupled to said key, said card having stored thereon data corresponding to data stored in said integrated circuit means.

8. The apparatus of claim 7, including a cord for coupling together said card and said key.

9. The apparatus of claim 1, wherein movement of said key receptacle by said key enables or disables, selectively, operation of said machine.

10. The apparatus of claim 7, wherein movement of said key receptacle by said key enables or disables, selectively, operation of said machine.

* * * * *